United States Patent
Seo et al.

(10) Patent No.: US 8,149,361 B2
(45) Date of Patent: Apr. 3, 2012

(54) LIQUID CRYSTAL DISPLAY

(75) Inventors: Bong-Sung Seo, Yongin-si (KR);
Jun-Woo Lee, Anyang-si (KR);
Young-Gu Kim, Suwon-si (KR);
Min-Sik Jung, Seoul (KR);
Byoung-Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 12/357,155

(22) Filed: Jan. 21, 2009

(65) Prior Publication Data
US 2009/0284702 A1 Nov. 19, 2009

(30) Foreign Application Priority Data

May 19, 2008 (KR) .................. 10-2008-0046241

(51) Int. Cl.
*G02F 1/1337* (2006.01)
(52) U.S. Cl. ...................... 349/128; 349/129
(58) Field of Classification Search .............. 349/128
See application file for complete search history.

(56) References Cited

U.S. PATENT DOCUMENTS

| 6,822,714 B1* | 11/2004 | Saito ............................. 349/129 |
| 7,057,698 B2* | 6/2006 | Chung et al. .................. 349/141 |
| 7,656,486 B2* | 2/2010 | Tasaka et al. ................. 349/129 |

FOREIGN PATENT DOCUMENTS

| JP | 09-061822 | 3/1997 |
| JP | 2002-040433 | 2/2002 |
| KR | 10-2001-0024339 | 3/2001 |
| KR | 1020040098728 | 11/2004 |

* cited by examiner

*Primary Examiner* — Richard Kim
(74) *Attorney, Agent, or Firm* — H.C. Park & Associates, PLC

(57) ABSTRACT

The present invention provides a liquid crystal display including a first substrate including a first alignment layer, gate lines, and data lines, a second substrate facing the first substrate and including a second alignment layer, and a liquid crystal layer disposed between the first substrate and the second substrate. A plurality of pixels are arranged in a matrix defined by the gate lines and the data lines, and alignment directions of the first alignment layer and the second alignment layer in a first pixel are different than alignment directions in a neighboring pixel.

19 Claims, 18 Drawing Sheets

(a)   (b)   (c)

(a)

(b)

(a)

(b)

100

(a)

200

(b)

(c)

(a)    (b)    (c)

(a)    (b)    (c)

(a)   (b)   (c)

(a)   (b)   (c)

LIQUID CRYSTAL DISPLAY

CROSS-REFERENCE TO RELATED APPLICATION

This application claims priority from and the benefit of Korean Patent Application No. 10-2008-0046241, filed on May 19, 2008, which is hereby incorporated by reference for all purposes as if fully set forth herein.

BACKGROUND OF THE INVENTION

1. Field of the Invention

The present invention relates to a liquid crystal display.

2. Discussion of the Background

A liquid crystal display (LCD) is one of the most widely used flat panel displays (FPDs), and it includes two display panels on which field generating electrodes are formed, and a liquid crystal layer disposed between the two display panels. A voltage is applied to the field generating electrodes to generate an electric field in the liquid crystal layer. The electric field determines the orientation of liquid crystal molecules of the liquid crystal layer and controls the polarization of incident light to display an image.

Among LCDs, a vertical alignment (VA) mode LCD, in which LC molecules are aligned such that the long axes of the LC molecules are perpendicular to the panels in the absence of an electric field, is spotlighted because of its high contrast ratio and wide reference viewing angle.

In a VA mode LCD, a wide reference viewing angle may be realized by forming a plurality of domains including LC molecules with different alignment directions in one pixel.

To form a plurality of domains in one pixel, cutouts, such as minute slits, may be formed in the field generating electrodes. In this case, the plurality of domains may be formed by aligning the liquid crystal molecules perpendicular to a fringe field generated between edges of the cutout and the field generating electrodes facing the edges.

However, in this structure, the aperture ratio may be decreased, and the liquid crystal molecules disposed close to the cutouts may be aligned vertical to the fringe field, but the liquid crystal molecules far from the cutouts may generate random motion such that the response speed is slow and a reversed direction domain is formed, which may generate temporary afterimages.

Alternatively, a plurality of domains may be formed in one pixel using a light alignment method in which the alignment direction of the liquid crystal molecules and the alignment angle are controlled by irradiating light on the alignment layer. In the light alignment method, it may not be necessary to form cutouts in the field generating electrodes because the aperture ratio may be increased and the response of the liquid crystal may be improved by a pretilt angle generated through light alignment.

On the other hand, a VA mode LCD may have lower side visibility than front visibility. Therefore, one pixel may be divided into two subpixels and different voltages may be applied to the subpixels to solve this problem.

However, when applying the light alignment method, texture may be generated at boundaries between the regions where the liquid crystal molecules are aligned in different directions. The texture decreases the transmittance and appears as spots, which may deteriorate the display characteristics.

SUMMARY OF THE INVENTION

The present invention provides a liquid crystal display that may have improved display characteristics.

Additional features of the invention will be set forth in the description which follows, and in part will be apparent from the description, or may be learned by practice of the invention.

The present invention discloses a liquid crystal display including a first substrate including a first alignment layer, gate lines, and data lines, a second substrate facing the first substrate and including a second alignment layer, and a liquid crystal layer disposed between the first substrate and the second substrate. A plurality of pixels are arranged in a matrix defined by the gate lines and the data lines, and an alignment direction of the first alignment layer or the second alignment layer of a first pixel is different than an alignment direction of the corresponding alignment layer in a neighboring pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
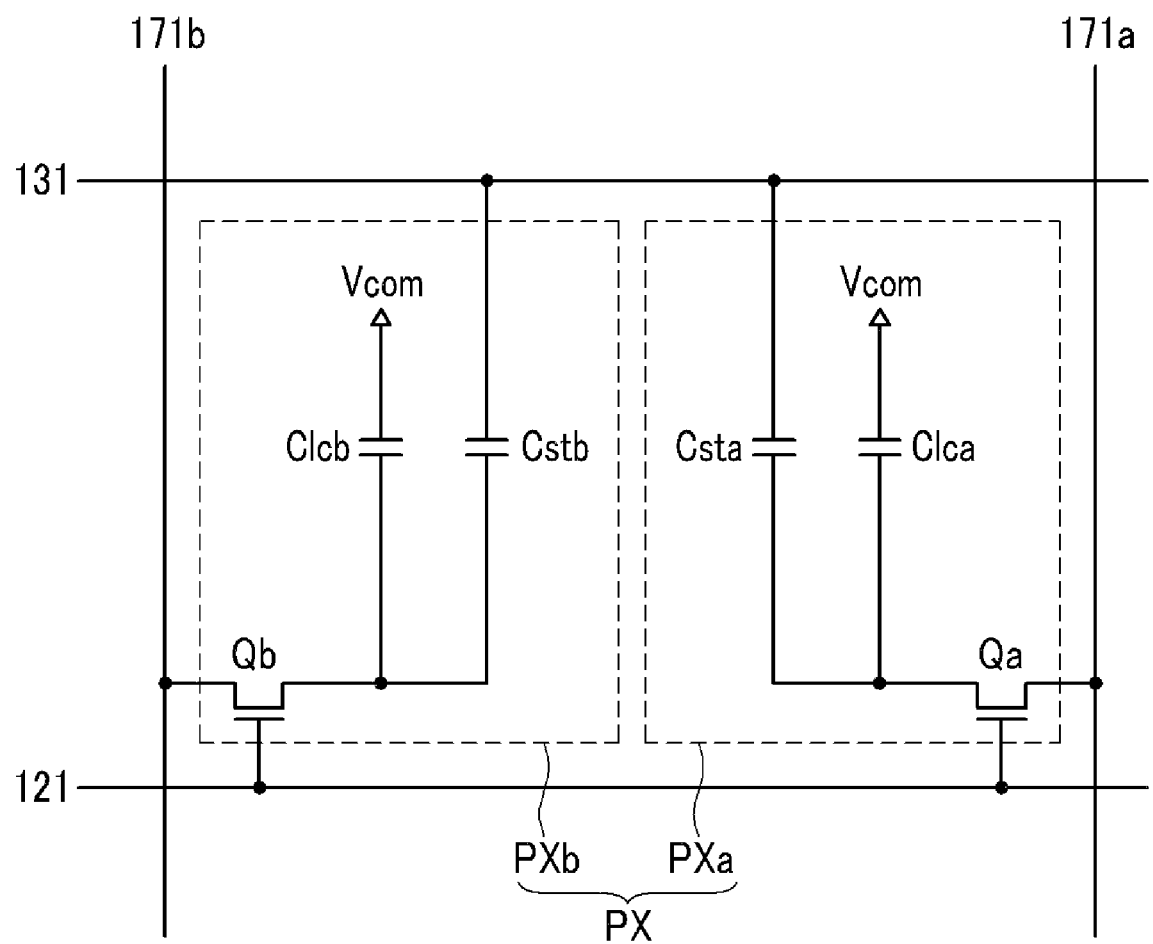
FIG. 1 is an equivalent circuit diagram of one pixel in a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Firstly, a schematic circuit structure of a liquid crystal display according to an exemplary embodiment of the present invention will be described with reference to FIG. 1.

FIG. 1 is an equivalent circuit diagram of one pixel of a liquid crystal display according to an exemplary embodiment of the present invention.

Referring to FIG. 1, a liquid crystal display according to an exemplary embodiment of the present invention includes a plurality of signal lines 121, 131, 171a, and 171b, and a pixel PX connected thereto. Referring to FIG. 2, FIG. 3, FIG. 4, and FIG. 5, in the viewpoint of the structure, the liquid crystal display according to the present exemplary embodiment includes a lower panel 100 and an upper panel 200 facing each other, and a liquid crystal layer 3 disposed therebetween. A pixel electrode 191 is formed in the lower panel 100, a common electrode 270 is formed on the upper panel 200, and alignment layers 11 and 21 are formed on the pixel electrode 191 and the common electrode 270, respectively. The pixel electrode 191 includes first and second subpixel electrodes 191a and 191b that are spaced apart from each other.

The signal lines 121, 131, 171a, and 171b are provided on the lower panel 100, and include a gate line 121 to transmit a gate signal, a pair of data lines 171a and 171b to transmit a data voltage, and a storage electrode line 131 to receive a storage voltage.

Each pixel PX includes a pair of subpixels PXa and PXb (see FIG. 1), and each subpixel PXa and PXb includes a switching element Qa and Qb, a liquid crystal capacitor Clca and Clcb, and a storage capacitor Csta and Cstb.

Each switching element Qa and Qb is a three terminal element including a control terminal, an input terminal, and an output terminal. The control terminal is connected to the gate line 121, the input terminal is connected to the corresponding data lines 171a and 171b, and the output terminal thereof is connected to the corresponding liquid crystal capacitors Clca and Clcb and storage capacitors Csta and Cstb.

Each liquid crystal capacitor Clca/Clcb includes a subpixel electrode 191a/191b of the lower panel 100 and the common electrode 270 of the upper panel 200 as two terminals, and the liquid crystal layer 3 between two electrodes 191a/191b and 270 functions as a dielectric material. The subpixel electrodes 191a/191b are connected to the switching elements Qa/Qb, and the common electrode 270 is formed on the entire surface of the upper panel 200 and receives a common voltage Vcom.

Each storage capacitor Csta/Cstb serves as an auxiliary to a liquid crystal capacitor Clca/Clcb and is formed by the storage electrode line 131 and the pixel electrode 191a/191b where they overlap each other via an insulator disposed therebetween. The storage capacitor Csta/Cstb may be omitted.

Figure 2:
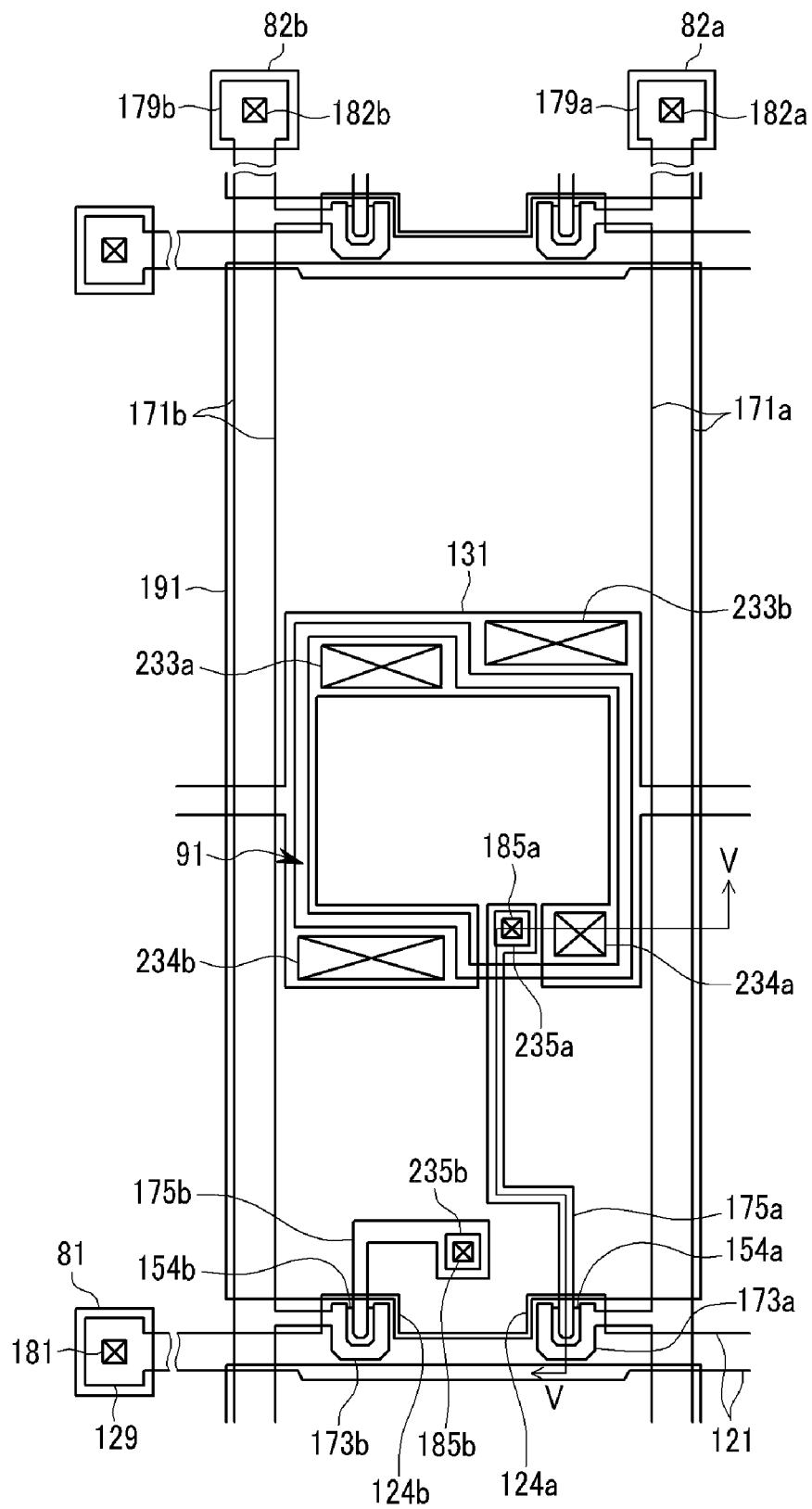
FIG. 2 is a layout view of a liquid crystal display according to an exemplary embodiment of the present invention.

Referring to FIG. 2, the pixel electrode 191 may have a rectangular shape in the longitudinal direction, and the first subpixel electrode 191a may be enclosed by the second subpixel electrode 191b.

The first subpixel electrode 191a may include two identical rectangles oriented in the longitudinal direction and that are longitudinally offset from and connected to each other. The dimensions of the two rectangles may be such that if the two rectangles were symmetrically aligned and combined, an approximate square would be formed. However, the ratio of the longitudinal length to the transverse length of the first subpixel electrode 191a may be changed.

The second sub-pixel electrode 191b may enclose the first sub-pixel electrode 191a with a gap 91 having a uniform width therebetween, and includes an upper electrode piece disposed on a first side of the first subpixel electrode 191a, a lower electrode piece disposed on a second side of the first subpixel electrode 191a, and connection pieces connecting the two electrode pieces on third and fourth sides of the first subpixel electrode 191a. The first and second sides of the first subpixel electrode 191a are opposite each other, and the third and fourth sides of the first subpixel electrode 191a are opposite each other.

The second subpixel electrode 191b is larger than the first subpixel electrode 191a, and a desired ratio of the areas thereof may be achieved by controlling the ratio of the longitudinal length of the first subpixel electrode 191a to that of the second subpixel electrode 191b. For example, the area of the second subpixel electrode 191b may be about two times the area of the first subpixel electrode 191a, and the first subpixel electrode 191a, the upper electrode piece, and the lower electrode piece may all have the same area.

The liquid crystal layer 3 may have negative dielectric anisotropy and may be aligned in the longitudinal direction. Polarizers (not shown) may be provided on outer surfaces of substrates 110 and 210, and polarization axes of the two polarizers may cross and form an angle of about 45 degrees with respect to the longitudinal and transverse directions.

In the absence of an electric field, that is, when a difference between voltages of the pixel electrode 191 and the common electrode 270 does not exist, the liquid crystal molecules 31 may be perpendicular to or slightly inclined from a direction perpendicular to the surface of the alignment layers 11 and 21.

If a potential difference is generated between the pixel electrode 191 and the common electrode 270, an electric field that is substantially perpendicular to the surface of the display panels 100 and 200 may be generated to the liquid crystal layer 3. Thus, the liquid crystal molecules 31 of the liquid crystal layer 3 may be aligned such that the long axes thereof are inclined vertically in the direction of the electric field in response to the electric field, and the degree of polarization of light that is incident to the liquid crystal layer 3 changes according to the inclination degree of the liquid crystal molecules 31. This change in the degree of polarization changes the transmittance by the polarizer, and thereby the liquid crystal display displays images. Hereafter, the pixel electrode 191 and the common electrode 270 are referred as "field generating electrodes".

Next, the pixel structure of the liquid crystal display according to an exemplary embodiment of the present invention will be described in detail with reference to FIG. 2, FIG. 3, FIG. 4, and FIG. 5.

Figure 3:
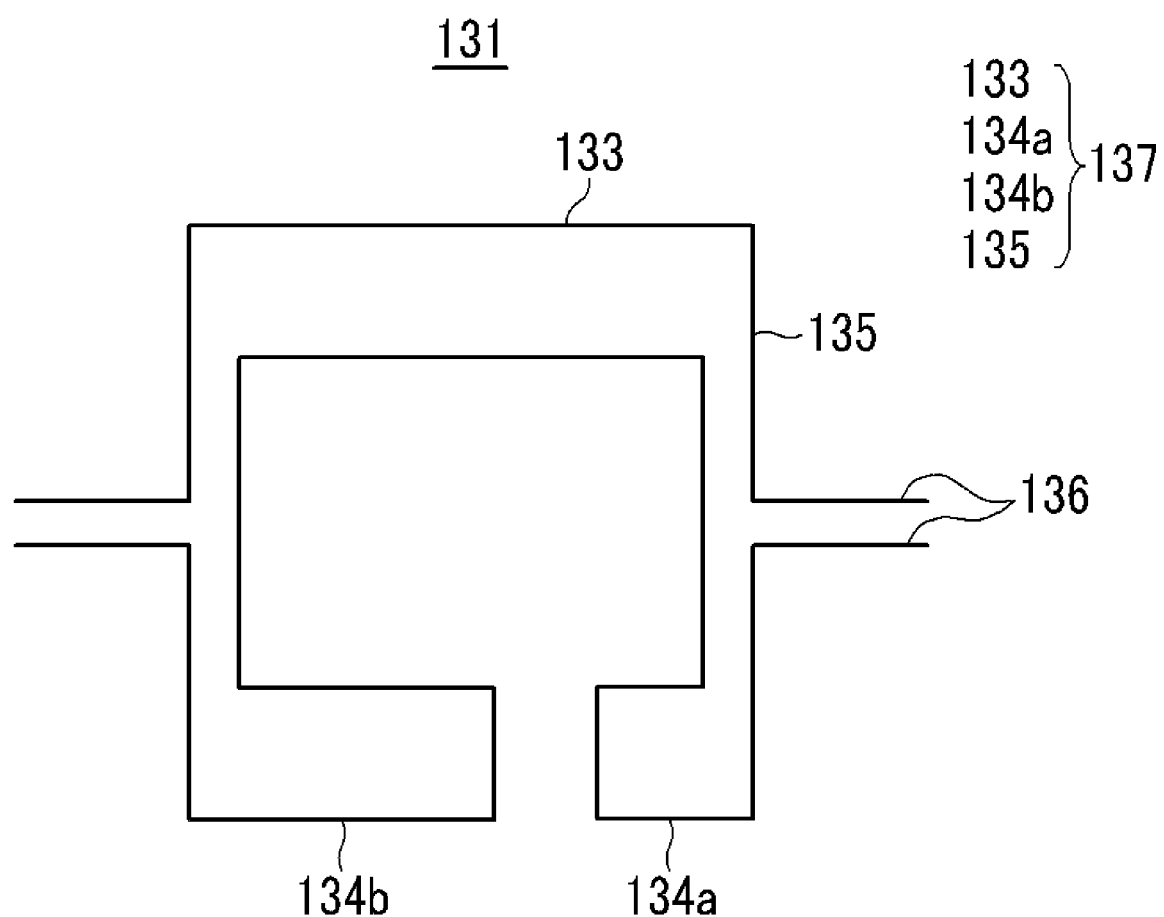
FIG. 3 is a layout view of the storage electrode line in the liquid crystal display shown in FIG. 2.
Figure 4:
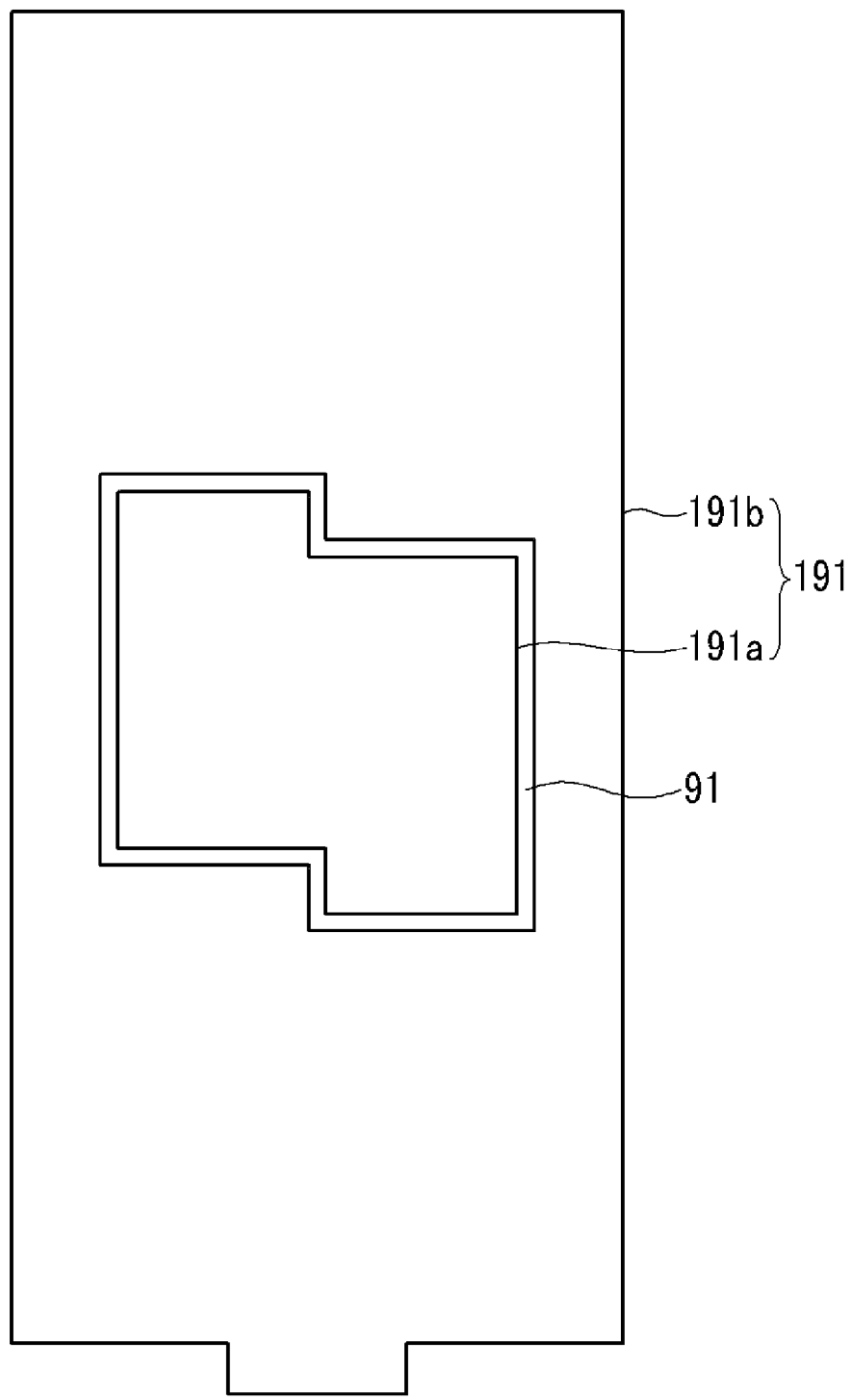
FIG. 4 is a layout view of the pixel electrode in the liquid crystal display shown in FIG. 2.
Figure 5:
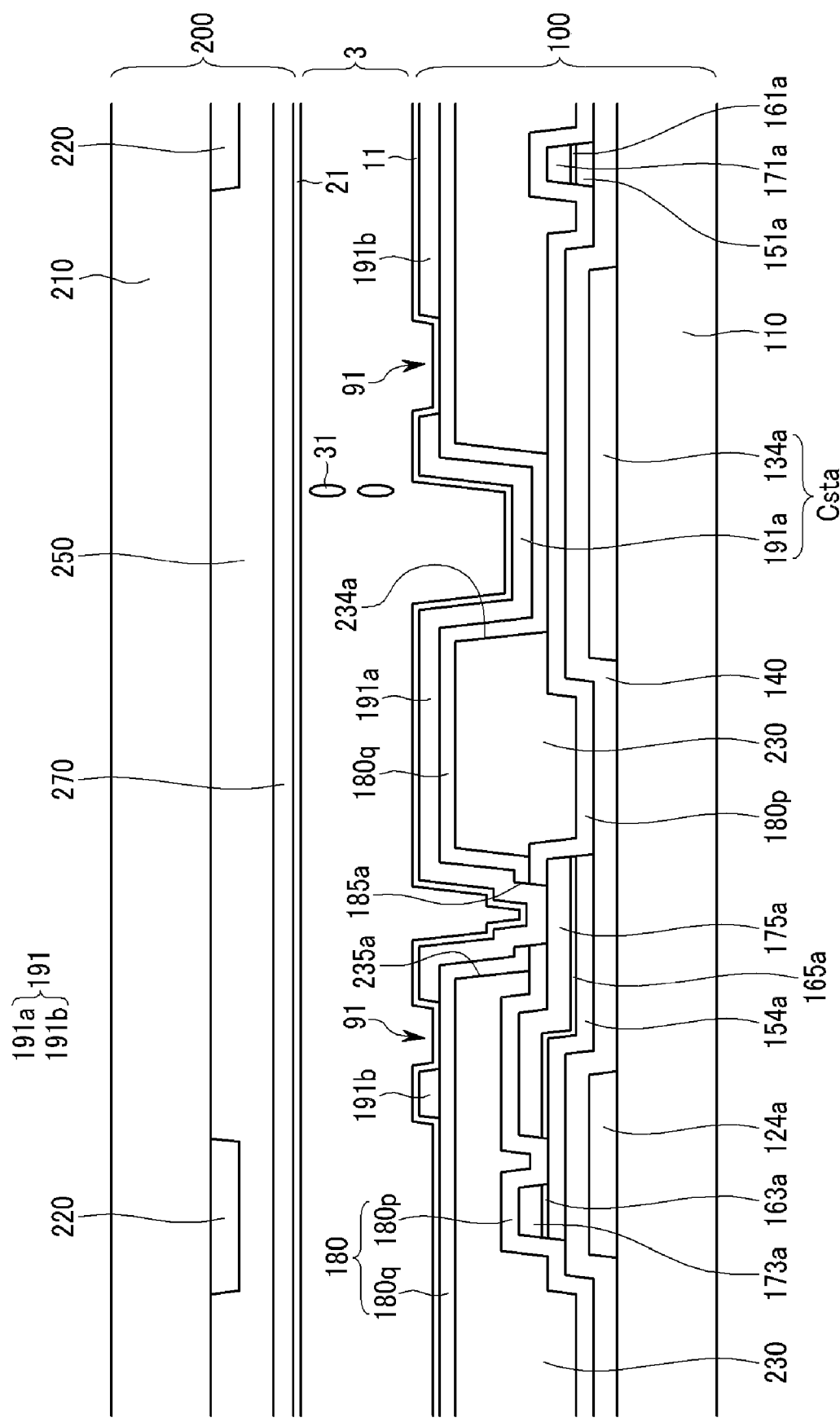
FIG. 5 is a cross-sectional view of the liquid crystal display shown in FIG. 2 taken along line V-V.

FIG. 2 is a layout view of a liquid crystal display according to an exemplary embodiment of the present invention, FIG. 3 is a layout view of the storage electrode line in the liquid crystal display shown in FIG. 2, FIG. 4 is a layout view of the pixel electrode in the liquid crystal display shown in FIG. 2, and FIG. 5 is a cross-sectional view of the liquid crystal display shown in FIG. 2 taken along line V-V.

Referring to FIG. 2, FIG. 3, FIG. 4, and FIG. 5, the liquid crystal display according to the present exemplary embodiment includes a lower panel (thin film transistor array panel) 100, an upper panel (common electrode panel) 200, and a liquid crystal layer 3.

First, the thin film transistor array panel 100 will be described.

A gate conductor including a plurality of gate lines 121 and a plurality of storage electrode lines 131 is formed on an insulation substrate 110.

The gate lines 121 extend mainly in a transverse direction, and each gate line 121 includes a plurality of first and second gate electrodes 124a and 124b that protrude upward, and a wide end portion 129.

Each storage electrode line 131 extends mainly in the transverse direction and is disposed between two gate lines 121.

Referring to FIG. 3, each storage electrode line 131 includes a storage electrode 137 with an opened quadrangle bent shape, and a connection 136 connected thereto. The storage electrode 137 includes transverse electrodes 133, 134a, and 134b, and longitudinal electrodes 135. The transverse electrodes 133, 134a, and 134b have a greater width than the longitudinal electrode 135. The transverse electrodes 133, 134a, and 134b include an upper electrode 133, a right lower electrode 134a, and a left lower electrode 134b. A first end of the upper electrode 133 and a first end of the right lower electrode 134a are connected by one longitudinal electrode 135, and a second end of the upper electrode 133 and a first end of the left lower electrode 134b are connected by the other longitude electrode 135. Second ends of the right lower electrode 134a and the left lower electrode 134b are spaced apart from each other, thereby forming the opened quadrangle shape. The connection 136 is connected to the center of the longitudinal electrode 135.

A gate insulating layer 140 is formed on the gate conductors 121 and 131.

A plurality of first and second semiconductor stripes 151a and 151b (in the drawing, "151a" appears and "151b" is not shown, however "151b" is used for convenience) are formed on the gate insulating layer 140. The first/second semiconductor stripe 151a/151b extends in the longitudinal direction, and includes a first/second protrusion 154a/154b extended toward the first/second gate electrode 124a/124b.

A plurality of first ohmic contact stripes 161a and first ohmic contact islands 165a are formed on the first semiconductor stripes 151a. The first ohmic contact stripes 161a include a plurality of first protrusions 163a, and a first protrusion 163a and a first ohmic contact island 165a are disposed on each first protrusion 154a.

A plurality of second ohmic contact stripes (not shown) and second ohmic contact islands (not shown) are formed on the second semiconductor stripes 151b. The second ohmic contact stripes also include a plurality of protrusions (not shown), and a protrusion and a second ohmic contact island are disposed on each second protrusion 154b.

A plurality of first data lines 171a are formed on the first ohmic contact stripes 161a, and a plurality of first drain electrodes 175a are formed on the first ohmic contact islands 165a. A plurality of second data lines 171b are formed on the second ohmic contact stripes, and a plurality of second drain electrodes 175b are formed on the second ohmic contact islands.

The first and second data lines 171a and 171b extend substantially in the longitudinal direction thereby crossing the gate lines 121 and the connections 136 of the storage electrode lines 131. The first/second data line 171a/171b includes a plurality of first/second source electrodes 173a/173b extending toward the first/second gate electrodes 124a/124b and end portions 179a/179b, respectively.

Each of the first and second drain electrodes 175a/175b includes a first end enclosed by a curved portion of the first/second source electrode 173a/173b on the first/second gate electrode 124a/124b and extends upward.

The ohmic contacts 161a and 165a only exist between the semiconductor stripes 151a thereabove and the first data lines 171a and the first drain electrodes 175a thereunder, and reduce contact resistance between them. The second ohmic contacts only exist between the underlying second semiconductor stripes 151b and the overlying second data lines 171b and second drain electrodes 175b, thereby reducing the contact resistance therebetween. The first semiconductor stripes 151a may have substantially the same planar shape as the first data lines 171a, the first drain electrodes 175a, and the first ohmic contacts 161a and 165a. The second semiconductor stripes 151b may have substantially the same planar shape as the second data lines 171b, the second drain electrodes 175b, and the second ohmic contacts. The semiconductor stripes 151a and 151b have portions that are exposed without being covered by the data lines 171a and 171b and the drain electrodes 175a and 175b, as well as portions between the source electrodes 173a and 173b and drain electrodes 175a and 175b.

A passivation layer 180 is formed on the first and second data lines 171a and 171b, the first and second drain electrodes 175a and 175b, and the exposed semiconductor stripes 151a and 154b. The passivation layer 180 includes a lower layer 180p, which may be made of an inorganic insulator such as silicon nitride or silicon oxide, and an upper layer 180q. At least one of the lower layer 180p and the upper layer 180q may be omitted.

The passivation layer 180 has a plurality of contact holes 182a and 182b exposing the end portions 179a and 179b of the data lines 171a and 171b and a plurality of contact holes 185a and 185b exposing the wide end portions of the drain electrodes 175a and 175b, and the passivation layer 180 and the gate insulating layer 140 have a plurality of contact holes 181 exposing the end portions 129 of the gate lines 121.

A plurality of color filters 230 are formed between the lower layer 180p and the upper layer 180q.

The color filters 230 have a plurality of through holes 235a and 235b corresponding to the contact holes 185a and 185b, and the through holes 235a and 235b are larger than the contact holes 185a and 185b. The color filters 230 include a plurality of openings 233a, 233b, 234a, and 234b formed on the storage electrodes 137. The openings 233a and 233b are formed on the upper electrode 133, and the openings 234a and 234b are respectively formed on the right lower electrode 134a and the left lower electrode 134b.

A plurality of pixel electrodes 191 and a plurality of contact assistants 81, 82a, and 82b are formed on the upper layer 180q.

As shown in FIG. 4, the pixel electrodes 191 according to the present exemplary embodiment have substantially the same shape as the pixel electrode 191 shown in FIG. 2. The gap 91 between the first subpixel electrode 191a and the second subpixel electrode 191b overlaps the storage electrode 137. The storage electrode 137 may block light leakage between the first subpixel electrode 191a and the second subpixel electrode 191b, and may simultaneously block texture generated by the light alignment. The pixel electrodes 191 overlap the storage electrodes 137 to form storage capacitors Csta/Cstb. That is, the first subpixel electrode 191a overlaps the upper electrode 133 and the right lower electrode 134a thereby forming the storage capacitor Csta, and the second subpixel electrode 191b overlaps the upper electrode 133 and the left lower electrode 134b thereby forming the storage capacitor Cstb. Here, the pixel electrode 191 and the storage electrode 137 overlap only via the passivation layer 180 in the openings 233a and 234a of the color filters 230, which may increase the capacitance of the storage capacitor.

The first/second gate electrode 124a/124b, the first/second protrusion 154a/154b of the first/second semiconductor stripe 151a/151b, the first/second source electrode 173a/173b, and the first/second drain electrode 175a/175b form the first/second thin film transistor Qa/Qb, and the first/second drain electrode 175a/175b is connected to the first/second subpixel electrode 191a/191b through the contact hole 185a/185b.

The contact assistants 81, 82a, and 82b are connected to the end portions 129, 179a, and 179b of the gate lines 121 and the data lines 171a and 171b. The contact assistants 81, 82a, and 82b complement adhesion of the end portions 129 of the gate lines 121 and the end portions 179a and 179b of the data lines 171a and 171b with an external device such as a driver IC, and protect them.

Next, the common electrode panel 200 will be described.

A plurality of light blocking members 220 are formed on an insulating substrate 210, an overcoat 250 is formed on the light blocking members 220, and a common electrode 270 is formed on the overcoat 250.

Alignment layers 11 and 21 are formed on the facing surfaces of the thin film transistor array panel 100 and the common electrode panel 200.

The direction of the liquid crystal molecules 31 is changed according to the characteristics of the alignment layers 11 and 21. For example, the alignment layers 11 and 21 may be irradiated by ultraviolet rays having different polarization directions, or different inclined angles, thereby determining the inclination directions of the liquid crystal molecules 31. The alignment directions of the alignment layers 11 and 21 are determined by the light alignment method, and the light alignments are shown in FIG. 6 and FIG. 7.

Figure 6:
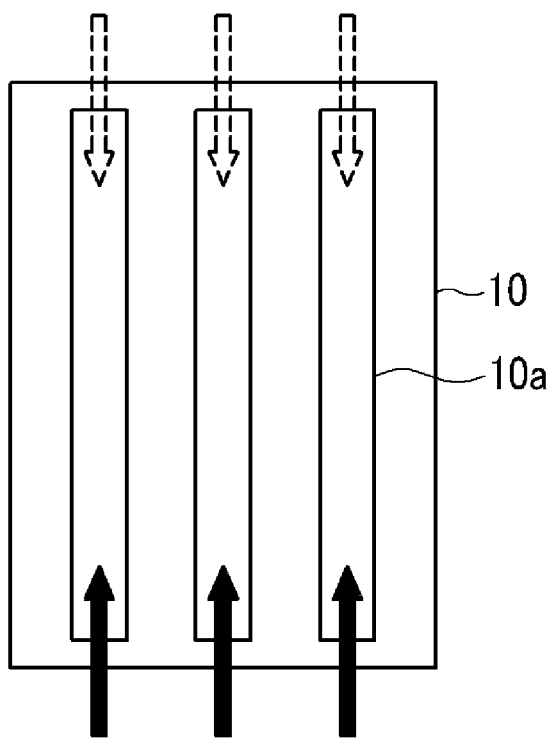
FIG. 6 is a schematic diagram showing two masks when performing light alignment.
Figure 6:
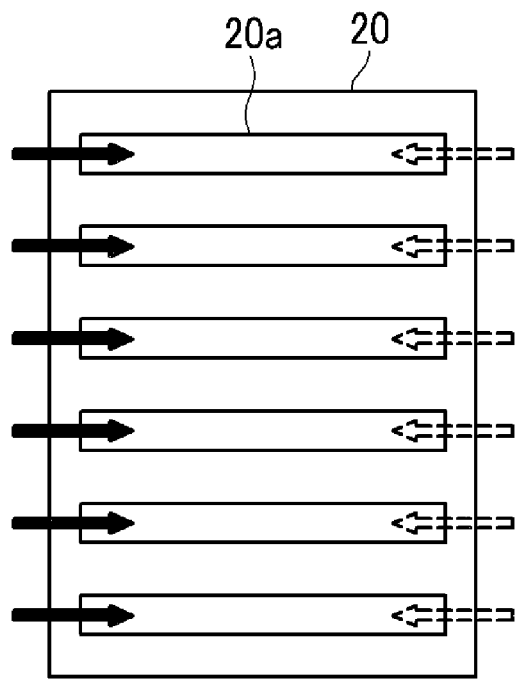
Figure 7:
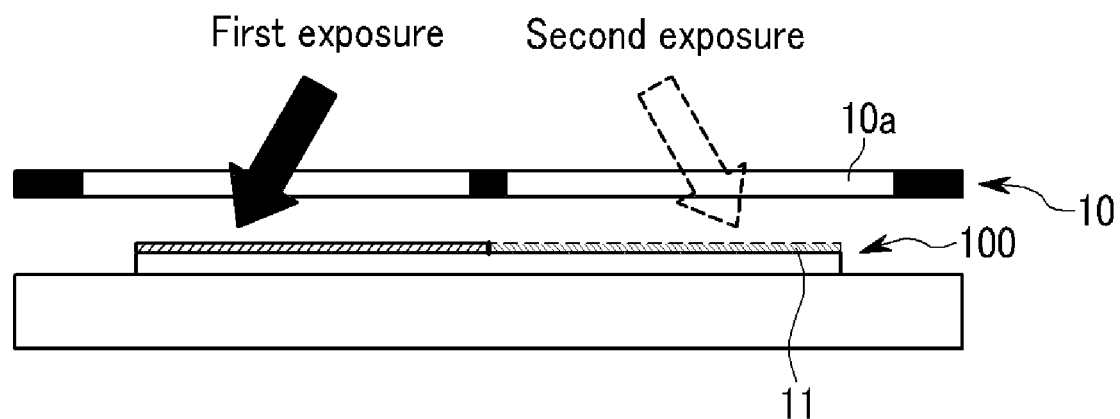
FIG. 7 is a schematic diagram showing a method of irradiating light using the mask shown in FIG. 6.
Figure 7:
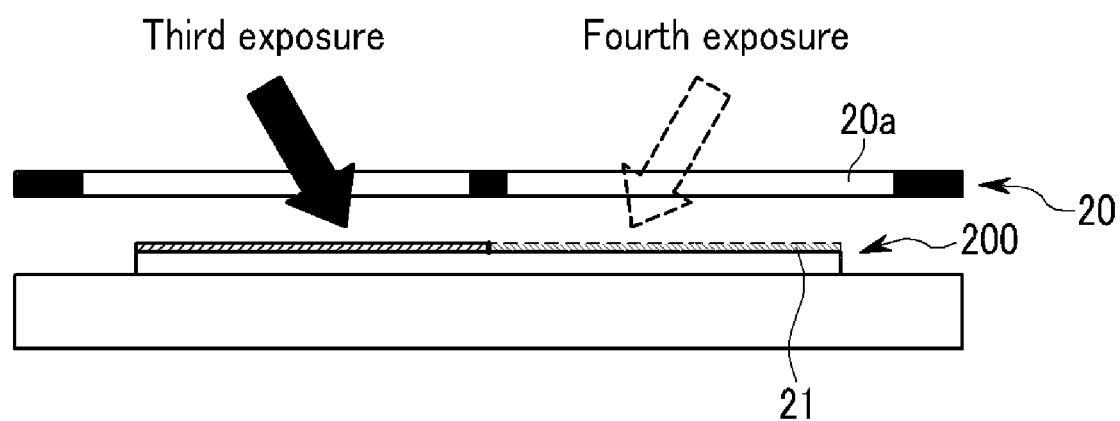

FIG. 6 is a schematic diagram showing two masks when executing light alignment, and FIG. 7 is a schematic diagram showing a method of irradiating light using the masks shown in FIG. 6.

Referring to FIG. 6, masks used during the light alignment may be a first mask 10 having a plurality of openings 10a formed in a direction parallel to a long edge of the substrate and a second mask 20 having a plurality of openings 20a formed in a direction perpendicular to the long edge of the substrate.

Referring to FIG. 6(a) and FIG. 7(a), a first exposure is performed by disposing the first mask 10 on the thin film transistor array panel 100 coated with the alignment layer 11, and light, such as ultraviolet (UV) rays, is irradiated at an oblique angle. Next, a second exposure is performed in which light, such as UV rays, is irradiated at an oblique angle in a direction opposite to the irradiation direction of the first exposure.

Here, the light irradiation is performed while moving according to the direction parallel to the long axis of the openings 10a of the mask 10, that is, the upper and lower directions (arrow direction) in FIG. 6(a). When the light irradiation is not executed while moving the mask in the direction parallel to the long axis of the openings 10a of the mask 10, the exposed region is actually not only reduced by the light diffraction, but also the process margin for the distance between the substrate and the mask and an exposure angle may be decreased. The method in which the light is obliquely irradiated to the surface of the alignment layer may be obtained by declining the substrate or the device for irradiating the light.

For example, the left half portion of the pixel area may be irradiated to have a declination direction from the lower side toward the upper side, and the right half portion of the pixel area is irradiated to have the declination direction from the lower side toward the upper side.

Similarly, referring to FIG. 6(b) and FIG. 7(b), a third exposure is performed by aligning the second mask 20 on the common electrode panel 200 coated with the alignment layer 21, and light, such as UV rays, may be irradiated at an oblique angle. Next, a fourth exposure may be performed by obliquely irradiating UV rays in a direction opposite the direction of the third exposure.

Here, the light irradiation is performed while moving in a direction parallel to the long axis of the openings 20a of the mask 20, that is to say in the right and left directions (arrow directions) in FIG. 6(b). For example, the upper half portion of the pixel area may be irradiated to have a declination direction from the left side toward the right side, and the lower half portion of the pixel area may be irradiated to have a declination direction from the right side toward the left side, and accordingly two regions having opposite declination directions may be formed. Or, for example, the upper half portion of the pixel area may be irradiated to have a declination direction from the right side toward the left side, and the lower half portion of the pixel area may be irradiated to have a declination direction from the left side toward the right side, and accordingly two regions having opposite declination directions may be formed.

In this way, an effect created by rubbing the surface of the alignment layer in a uniform direction may be obtained by instead obliquely irradiating light with respect to the surface of the alignment layer. That is, the alignment direction of the surface of the alignment layer may be changed according to the direction of the light irradiation such that one pixel may be divided into a plurality of regions, and as a result a plurality of domains having liquid crystal molecules pre-tilted in various directions may be formed in one pixel through the exposure.

Generally, the liquid crystal molecules are aligned in the direction in which the UV rays are irradiated, and the irradiation method may more elaborately control more alignment directions of the liquid crystal than rubbing.

Differently from FIG. 6 and FIG. 7, the mask may include a structure forming a lattice shape, as the above-described mask is only an exemplary embodiment, and various masks may be used in other exemplary embodiments of the mask.

The light alignment method has been described through FIG. 6 and FIG. 7, and hereafter various alignments of the liquid crystal molecules 31 of neighboring pixels will be described through various exemplary embodiments.

Figure 8:
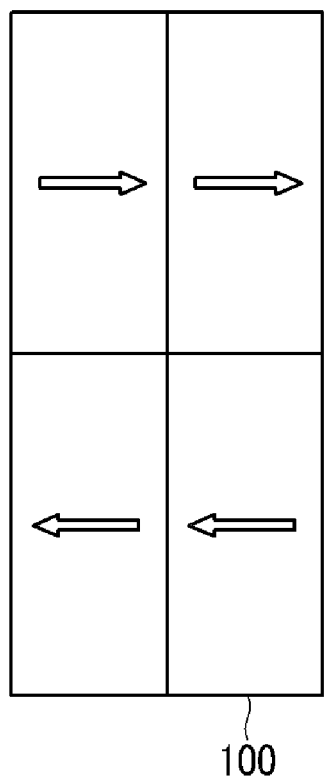
FIG. 8 is a view showing the alignment directions of neighboring pixels according to the first exemplary embodiment of the present invention.
Figure 8:
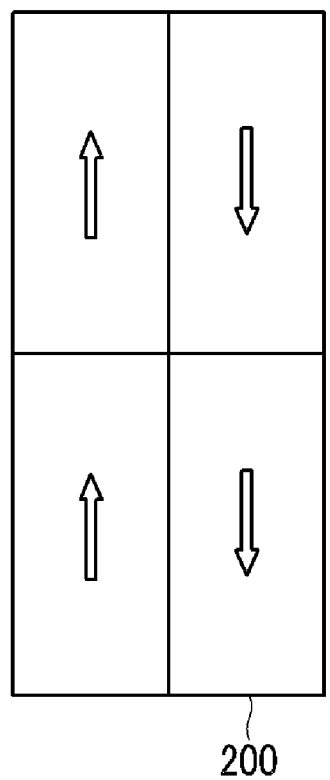
Figure 8:
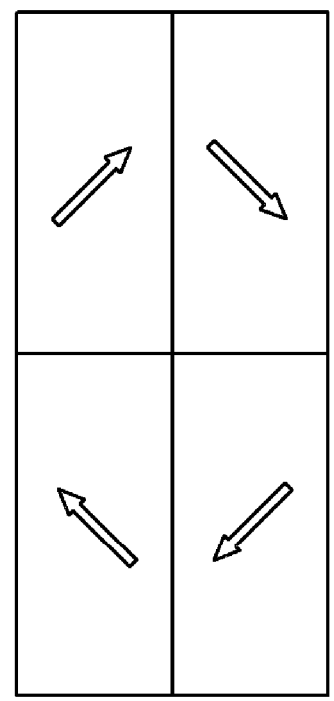
Figure 9:
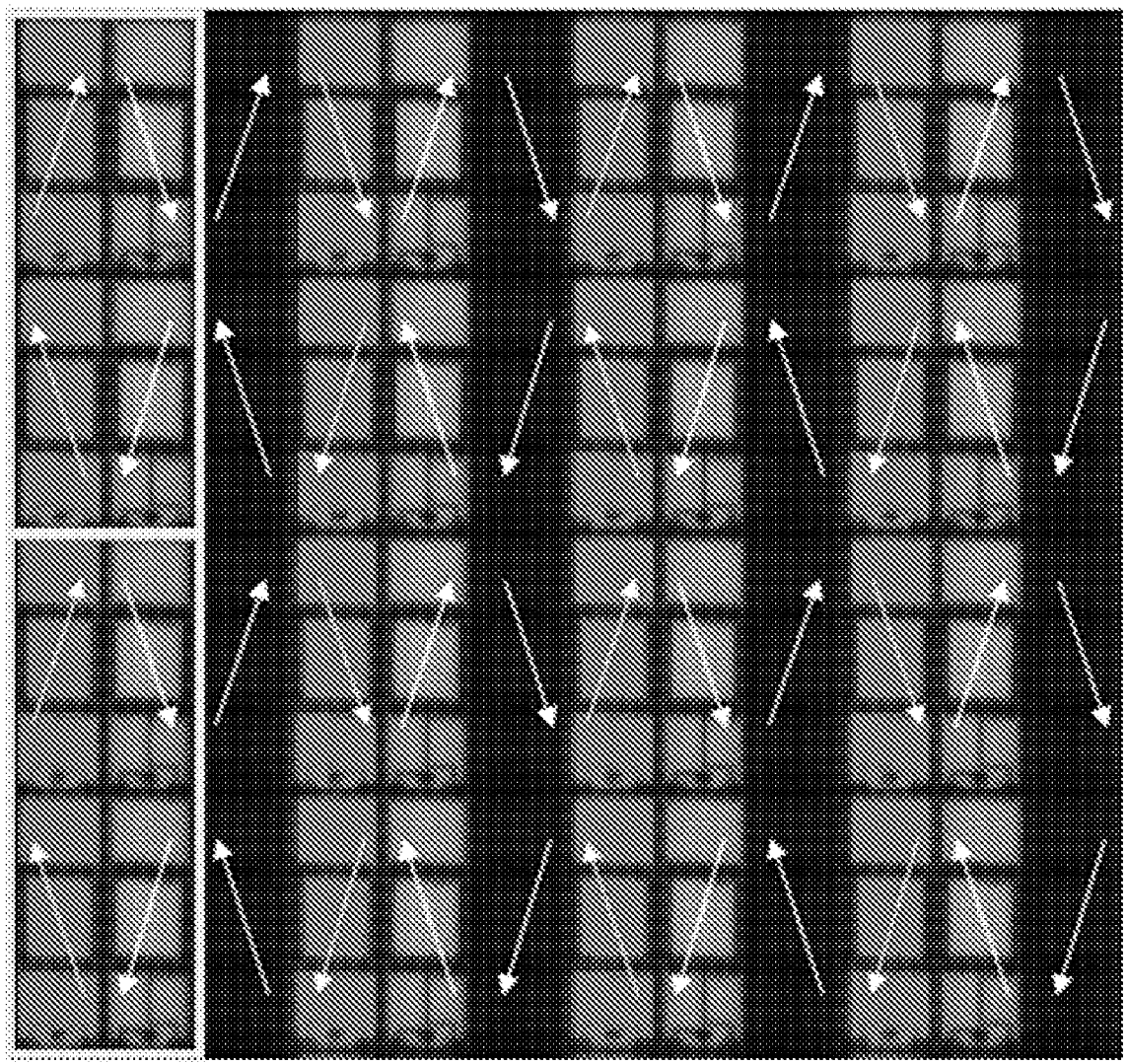
FIG. 9 and FIG. 10 are views showing alignment directions of neighboring pixels according to the first exemplary embodiment of the present invention.
Figure 10:
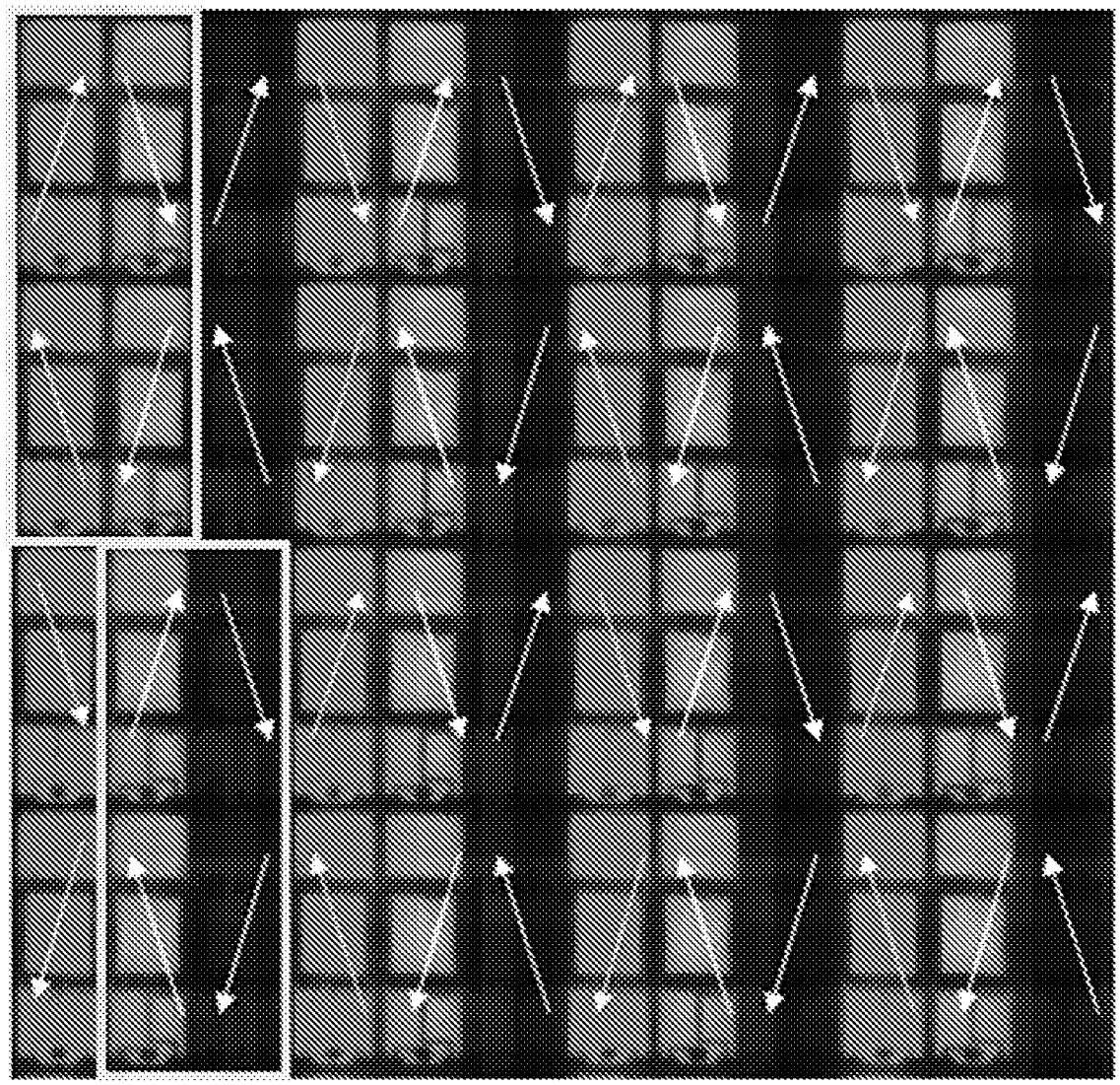

FIG. 8 is a view showing the alignment directions between the neighboring pixels according to the first exemplary embodiment of the present invention, and FIG. 9 and FIG. 10 are views showing exemplary embodiments differently forming the alignment directions of neighboring pixels according to the first exemplary embodiment of the present invention.

Firstly, FIG. 8(a) shows an alignment direction of a thin film transistor array panel 100, and in detail, the alignment of the liquid crystal molecules 31 due to the light alignment of the lower alignment layer 11 is shown by the arrow directions. FIG. 8(b) shows an alignment direction of a common electrode panel 200, and in detail, the alignment of the liquid crystal molecules 31 due to the light alignment of the upper alignment layer 21 is shown by the arrow directions. Finally, FIG. 8(c) shows an alignment direction of the liquid crystal molecules 31 when the alignment directions of (a) and (b) are combined in the liquid crystal display including the thin film transistor array panel 100 and the common electrode panel 200. It is confirmed that the alignment direction of (c) is the vector sum of the alignment directions of (a) and (b).

In (a), (b), and (c), the boundaries of the solid lines indicate divisions of each pixel area. The descriptions of (a), (b), (c), and the solid line are also the same for FIG. 11, FIG. 15, FIG. 16, FIG. 17, FIG. 18, FIG. 19, and FIG. 20 to be described below.

Four pixels arranged in a 2×2 matrix shape, as shown in FIG. 8, is referred as a pixel group.

Firstly, referring to FIG. 8(a), two pixels of an upper pixel row are aligned in the right direction and two pixels of the lower pixel row are aligned in the left direction through the light alignment of the lower alignment layer 11. Referring to FIG. 8(b), the two pixels of the left side column are aligned in the upward direction and the two pixels of the right side column are aligned in the downward direction through the light alignment of the upper alignment layer 21. As a result, as shown in FIG. 8(c), the four neighboring pixels of the pixel group have different alignment directions in the liquid crystal display, that is, the left upper pixel has an alignment direction of the right upper direction, the right upper pixel has an alignment direction of the right lower direction, the right lower pixel has an alignment direction of the left lower direction, and the left lower pixel has an alignment direction of the left upper direction. The liquid crystal alignment directions circulate in the clockwise direction, and this is hereafter referred to as circular liquid crystal alignment. Accordingly, the four neighboring pixels have different alignment directions such that a wide viewing angle may be obtained, and the boundaries of the liquid crystal alignment directions are changed according to the boundaries of each pixel such that the texture is covered by the gate lines and the data lines, and as a result the texture does not appear to the outside to thereby improve the display characteristics.

Considering the structures of FIG. 8(c) and FIG. 2, FIG. 3, FIG. 4, and FIG. 5, the liquid crystal alignment direction is more complicated. This is because the pixel electrode 191 includes the first subpixel electrode 191a and the second subpixel electrode 191b, and the first subpixel electrode 191a and the second subpixel electrode 191b are generally applied with different voltages under the application of the electric field. That is, in FIG. 8(c), the left upper pixel has the right upper alignment direction when the liquid crystal molecules are rotated according the application of the electric field, and the liquid crystal molecules are arranged in different directions on the region of the first subpixel electrode 191a and the region of the second subpixel electrode 191b in the left upper pixel. As a result, the merit of having various viewing angle characteristics may be obtained.

FIG. 9 shows the liquid crystal display having four repeated pixel groups of FIG. 8. In FIG. 9, it is shown that four pixel groups having the circular liquid crystal alignment direction are assigned as two blocks, each of which is shown in a gray box. Accordingly, it may be confirmed that four pixel groups having the circular liquid crystal alignment direction are uniformly arranged in the up-down and right-left directions.

On the other hand, four pixel groups having the circular liquid crystal alignment direction are crossed with each other in FIG. 10, different from FIG. 9. That is, four pixel groups having the circular liquid crystal alignment direction are also assigned as two blocks, each of which is shown in a gray box in FIG. 10, and it may be confirmed that the upper block and the lower block are crossed by one column. Accordingly, four pixel groups having the circular liquid crystal alignment direction may be arranged in the various types.

Figure 11:
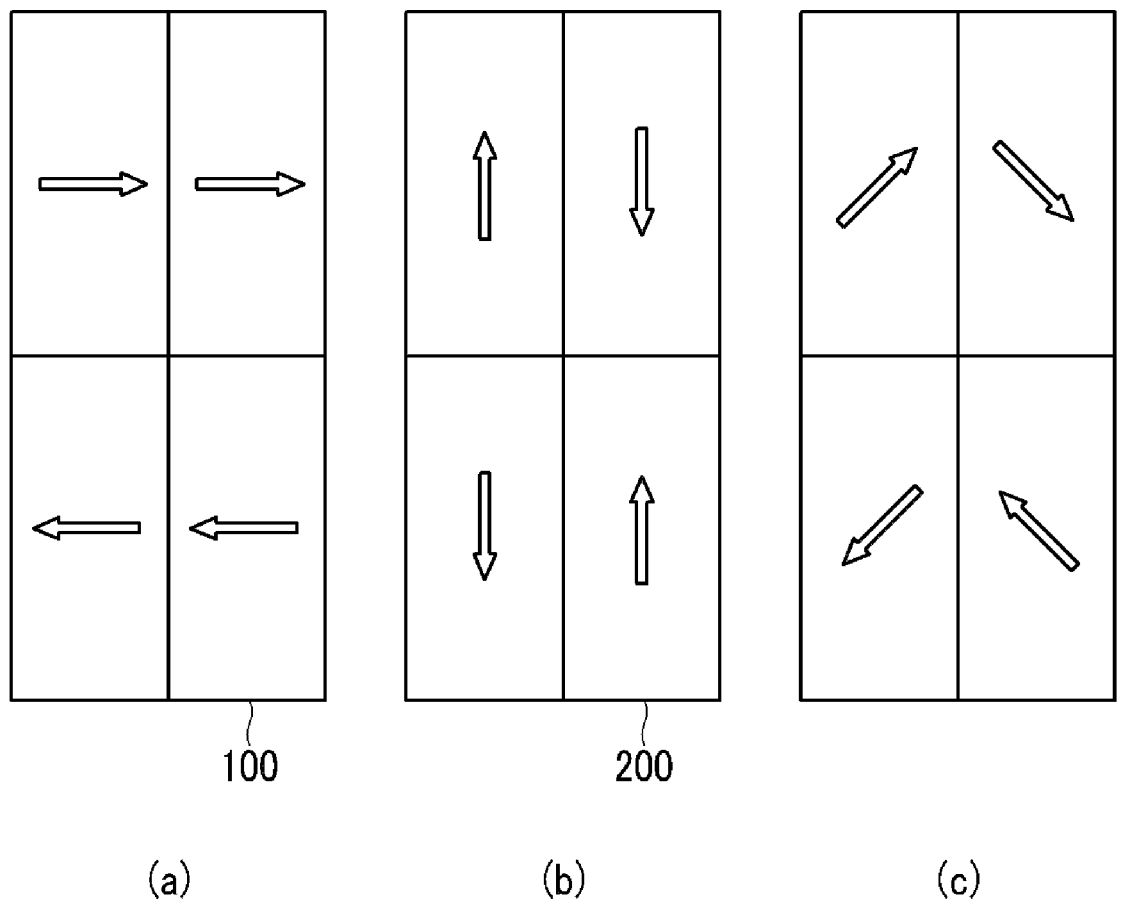
FIG. 11 is a view showing alignment directions of neighboring pixels according to the second exemplary embodiment of the present invention.
Figure 12:
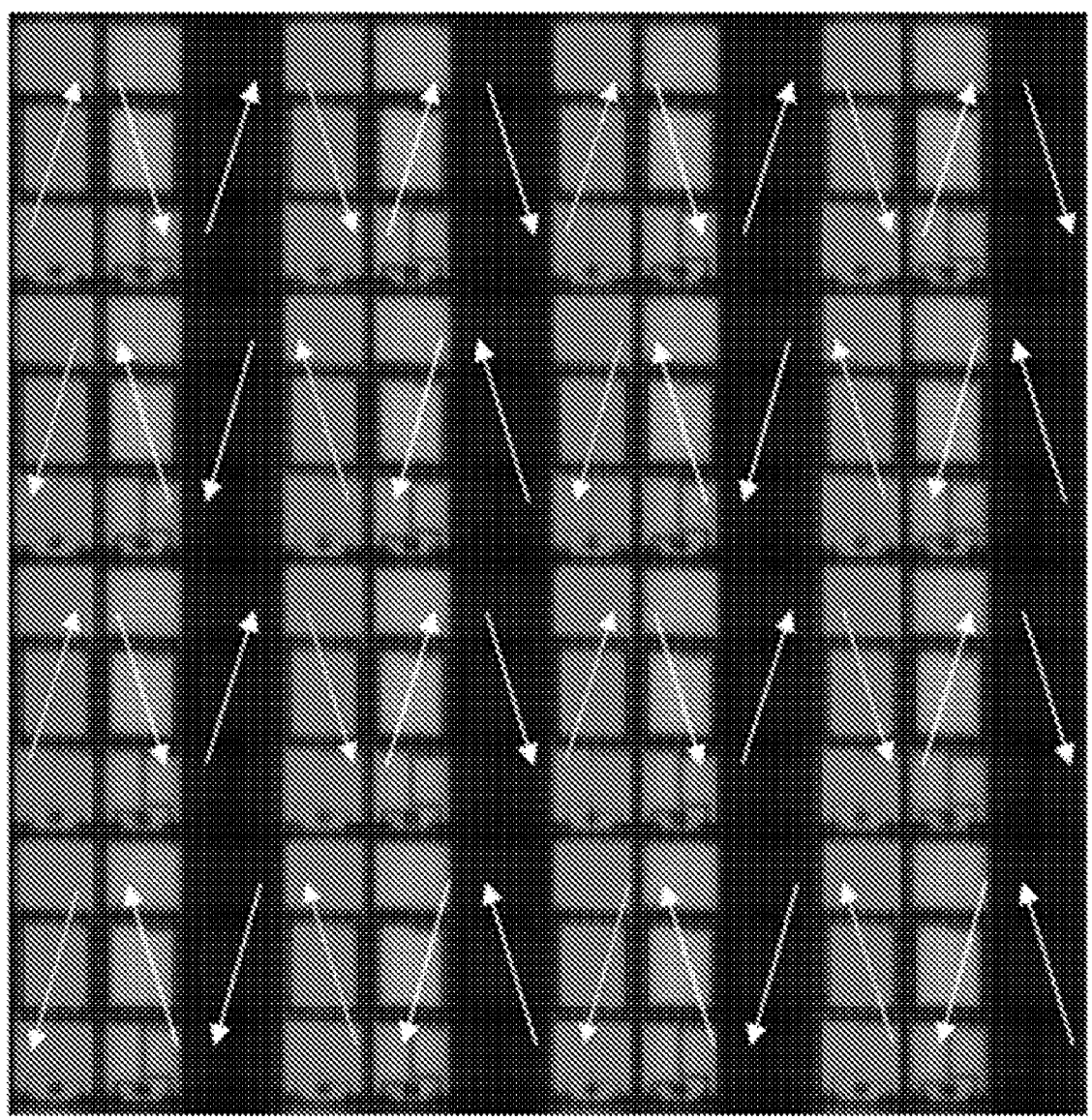
FIG. 12 and FIG. 13 are views showing alignment directions of neighboring pixels according to the second exemplary embodiment of the present invention.
Figure 13:
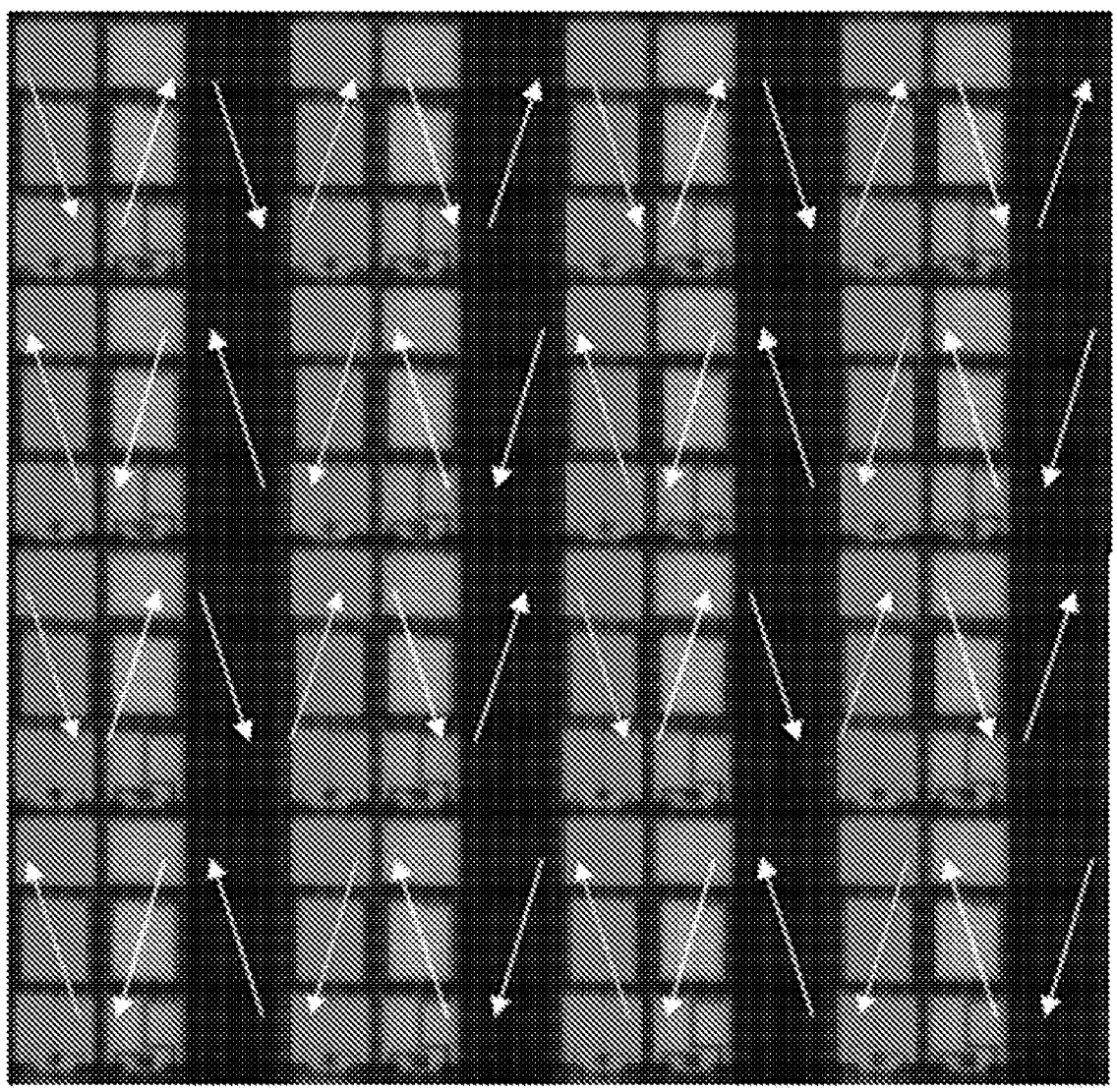

FIG. 11 is a view showing the alignment directions of neighboring pixels according to the second exemplary embodiment of the present invention, and FIG. 12 and FIG. 13 are views showing exemplary embodiments forming different alignment directions in neighboring pixels according to the second exemplary embodiment of the present invention.

Firstly, referring to FIG. 11(a), an upper pixel row of two pixel rows is aligned in the right direction, and the lower pixel row is aligned in the left direction through the light alignment of the lower alignment layer 11 for two pixel rows. On the other hand, referring to FIG. 11(b), the left upper pixel and the right lower pixel are aligned in the upward direction and the right upper pixel and the left lower pixel are aligned in the downward direction through the light alignment of the upper alignment layer 21. As a result, as shown in FIG. 11(c), the pixel group including four neighboring pixels has different alignment directions in the liquid crystal display, that is, the left upper pixel has the alignment direction of the right upward direction, the right upper pixel has the alignment direction of the right downward direction, the right lower pixel has the alignment direction of the left upward direction, and the left lower pixel has the alignment direction of the left downward direction. This is a structure in which the alignment directions are changed with a wave shape in one direction per pixel row as a non-circulated liquid crystal alignment direction, which is referred to as non-circular liquid crystal alignment. Accordingly, the four neighboring pixels have different alignment directions such that a wide viewing angle may be obtained and the boundaries of the liquid crystal alignment directions are changed according to the boundaries of each pixel such that the texture is covered by the gate lines and the data lines, and as a result the texture may not appear, thereby improving the display characteristics.

FIG. 12 shows the liquid crystal display having four neighboring pixel groups of FIG. 11, which are repeated.

On the other hand, FIG. 13 shows the liquid crystal display having four neighboring pixel groups that are differently disposed by one column compared with FIG. 12. That is, the alignment direction of the pixel group of FIG. 11(c) is formed from the first column in FIG. 12, however, the alignment direction of the pixel group of FIG. 11(c) is formed from the second column in FIG. 13. Accordingly, it may be confirmed that four pixel groups having the non-circular liquid crystal alignment direction are arranged in the various types.

As above-described, in FIG. 8, FIG. 9, FIG. 10, FIG. 11, FIG. 12, and FIG. 13, four neighboring pixel groups have different liquid crystal alignment directions from each other such that the texture does not appear to thereby increase the luminance as well as to improve the display quality. The improvement degree of luminance will be described in comparison with other structures as follows.

TABLE 1

| Structures | Degree of increase of transmittance |
|---|---|
| Ra | 3.81% |
| Rb-1 | 4.18% |
| Rb-2 | 4.16% |
| FIG. 9 | 5.42% |
| FIG. 10 | 5.48% |
| FIG. 12 | 5.51% |

In Table 1, the Ra structure, which is called PVA, is a structure in which the uniform pattern is added per each pixel to control the alignment direction of the liquid crystal molecules. On the other hand, Rb-1 and Rb-2 are structures in which one pixel area is divided into four subpixel areas, and the circular liquid crystal alignment or the non-circular liquid crystal alignment is adapted.

Figure 14:
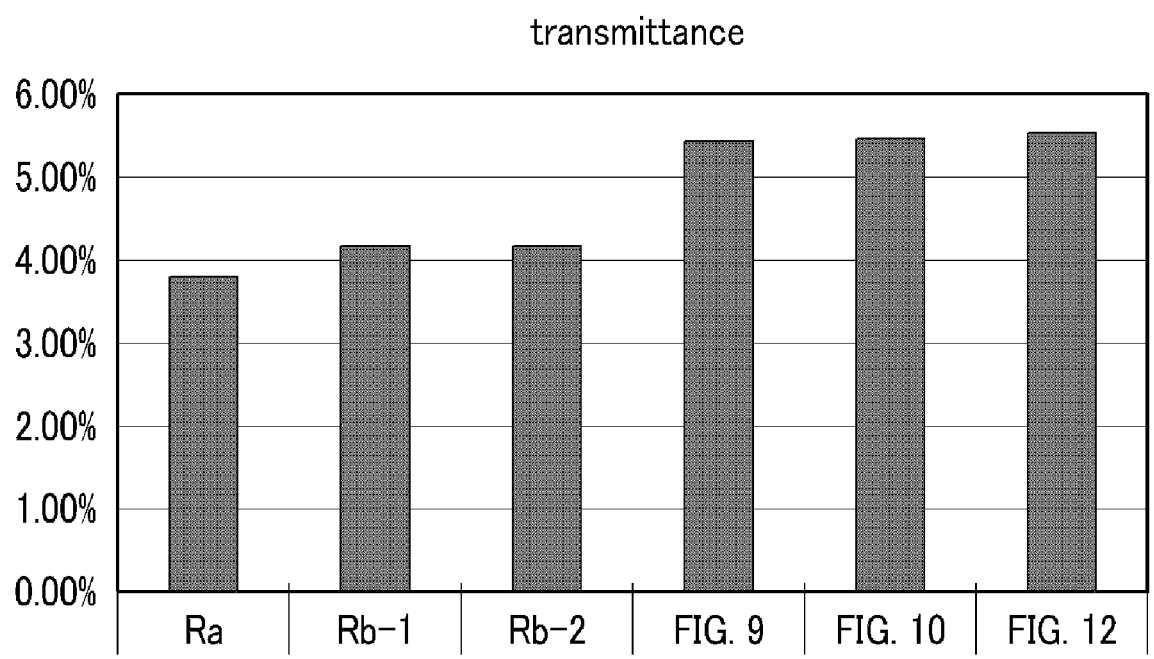
FIG. 14 is a graph comparing the transmittances of the liquid crystal displays according to the first exemplary embodiment and the second exemplary embodiment.

Table 1 and FIG. 14 are comparisons of the improvement degree of the transmittances on the basis of the reference and show the same improvement degree of the transmittances. Accordingly, comparing the liquid crystal display according to the exemplary embodiment of the present invention, the luminance is improved by 1.3% to 1.7%.

Therefore, texture may not be shown and the luminance may be improved.

The third exemplary embodiment of liquid crystal alignment of neighboring pixels will be described with reference FIG. 15, FIG. 16, FIG. 17, and FIG. 18.

Figure 15:
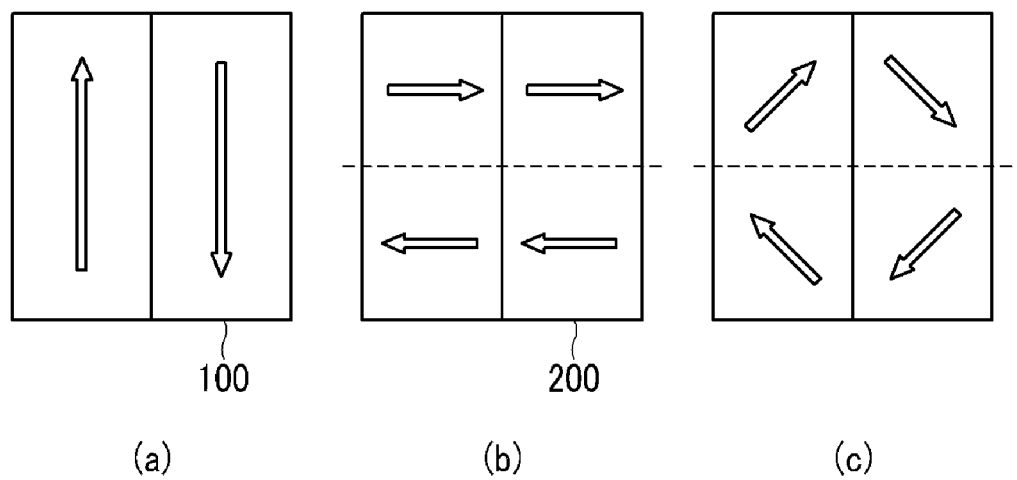
FIG. 15, FIG. 16, FIG. 17, and FIG. 18 are exemplary embodiments showing two neighboring pixels having different alignment directions according to the third exemplary embodiment of the present invention.
Figure 16:
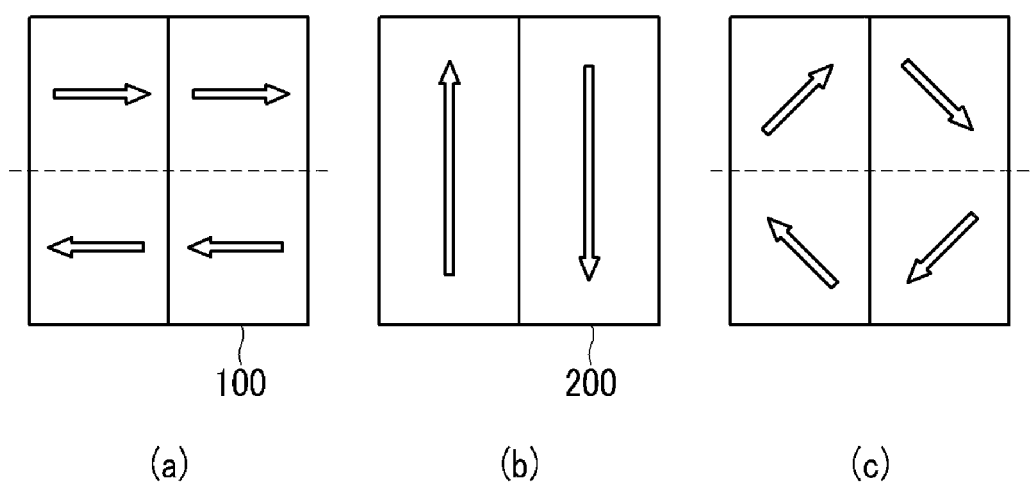
Figure 17:
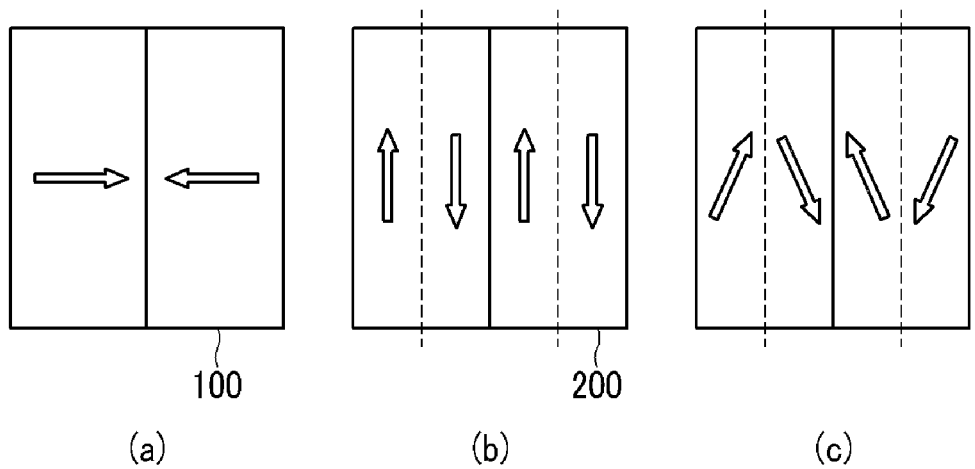
Figure 18:
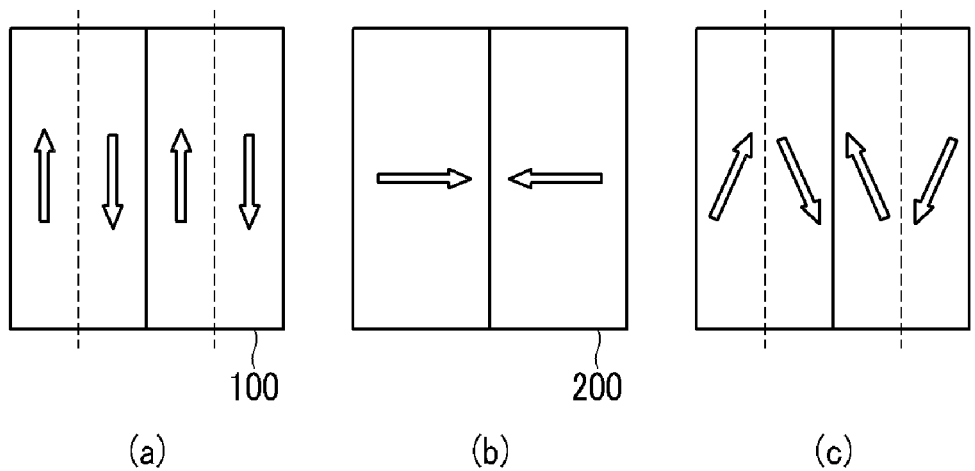

FIG. 15, FIG. 16, FIG. 17, and FIG. 18 are exemplary embodiments in which two neighboring pixels have different alignment directions. Here, in two neighboring pixels, the alignment direction of one of the upper alignment layer and the lower alignment layer is divided by pixel unit, and the alignment direction of the other one is divided by two alignment directions for one pixel. FIG. 15 and FIG. 16 are exemplary embodiments of the circular liquid crystal alignment, and FIG. 17 and FIG. 18 are exemplary embodiments of the non-circular liquid crystal alignment.

FIG. 15, FIG. 16, FIG. 17, and FIG. 18 are described on the basis of a pixel group in which one row is made of two pixels. However, as another exemplary embodiment, it may be adapted to a pixel group in which one column is made of two pixels.

Firstly, referring to FIG. 15(*a*), the left pixel array is aligned in the upward direction and the right pixel array is aligned in the downward direction through the light alignment of the lower alignment layer 11 per pixel array. On the other hand, as shown in FIG. 15(*b*), one pixel row is divided into an upper portion and a lower portion, and the upper portion is aligned in the right direction and the lower portion is aligned in the left direction through the light alignment of the upper alignment layer 21. As a result, as shown in FIG. 15(*c*), two neighboring pixels (hereinafter referred to as two neighboring pixel groups) respectively have two different alignment directions, and have different alignment directions between the neighboring pixels for one pixel row in the liquid crystal display. That is, the upper portion of the left pixel has the right upper alignment direction, and the lower portion of the left pixel has the left upper alignment direction. Also, the upper portion of the right pixel has the right lower alignment direction, and the lower portion of the right pixel has the left lower alignment direction. As a result, the circular liquid crystal alignment of the clockwise direction is formed and the two neighboring pixels have different alignment directions of four directions such that the wide viewing angle may be obtained, and the boundaries of the liquid crystal alignment directions are changed according to the boundaries of each pixel such that the texture may be covered by the gate lines and the data lines, and as a result the texture may not appear, thereby improving the display characteristics.

FIG. 15 schematically shows the lower and upper panels 100 and 200, the solid lines indicate the boundaries of the pixel, and the dotted lines indicate the divisions of the portions of the pixel. This is the same as in FIG. 16, FIG. 17, and FIG. 18.

If the structures of FIG. 15(*c*) and FIG. 2, FIG. 3, FIG. 4, and FIG. 5 are combined, more complicated alignment directions are shown. This is because the structure of FIG. 2, FIG. 3, FIG. 4, and FIG. 5 includes the subpixel electrodes 191*a* and 191*b*. That is, in FIG. 15(*c*), the upper pixel portion of the left pixel includes, in detail, the portions of the first subpixel electrode 191*a* and the second subpixel electrode 191*b*, and the liquid crystal molecules of these portions are aligned in the right upward direction. When applying the electric field, the first subpixel electrode 191*a* and the second subpixel electrode 191*b* may receive different voltages such that the liquid crystal alignment directions are different. As a result, the viewing angle characteristics of various directions may be obtained, thereby improving the viewing angle characteristics. This is the same in the other portions in FIG. 15(*c*).

On the other hand, referring to FIG. 16(*c*), the same alignment directions as those of FIG. 15(*c*) are shown (i.e., the circular liquid crystal alignment direction of the clockwise direction). In FIG. 16, the lower alignment layer 11 and the upper alignment layer 21 are aligned in different directions, however the alignment directions overall are the same.

That is, one pixel row is divided into the upper and lower portion pixel rows in FIG. 16(*a*), and the upper portion pixel row is aligned in the right direction and the lower portion pixel row is aligned in the left direction through the light alignment of the lower alignment layer 11. Also, the left pixel array is aligned in the upward direction and the right pixel array is aligned in the downward direction per pixel array through the light alignment of the upper alignment layer 21 in FIG. 16(*b*). As a result, as shown in FIG. 16(*c*), the liquid crystal display includes two neighboring pixel groups having the same alignment directions as those of FIG. 15(*c*).

FIG. 16 shows that the alignment layers are aligned with the same alignment directions under the entire liquid crystal display even though the alignment layers are respectively aligned in different directions from those of FIG. 15, and more various alignment directions may be formed. This is based on the fact that the alignment directions of the entire liquid crystal display are determined through the vector sum of the alignment directions of the lower alignment layer and the alignment directions of the upper alignment layer.

FIG. 17 and FIG. 18 show exemplary embodiments of the not-circular liquid crystal alignment, and the lower alignment layer 11 and the upper alignment layer 21 are differently aligned, however the alignment directions of the liquid crystal display are the same.

Firstly, referring to FIG. 17(*a*), the left pixel array is aligned in the right direction and the right pixel array is aligned in the left direction for one pixel array through the light alignment of the lower alignment layer 11. On the other hand, referring to FIG. 17(*b*), one pixel is divided into the left and right portion pixel rows, and the left portion pixel row is aligned in the upward direction and the right portion pixel row is aligned in the downward direction through the light alignment of the upper alignment layer 21.

On the other hand, referring to FIG. 18(*a*), one pixel is divided into left and right portion pixel rows, and the left portion pixel row is aligned in the upward direction and the right portion pixel row is aligned in the downward direction through the light alignment of the lower alignment layer 11. Further, referring to FIG. 18(*b*), the left pixel array is aligned in the right direction and the right pixel array is aligned in the left direction for one pixel array through the light alignment of the upper alignment layer 21.

FIGS. 17(*a*) and (*b*), and FIGS. 18(*a*) and (*b*), are respectively aligned in different alignment directions, however the alignment directions of the liquid crystal display are the same as shown in FIG. 17(*c*) and FIG. 18(*c*).

That is, FIG. 17(*c*) and FIG. 18(*c*) show the alignment directions as follows in two neighboring pixel groups of one pixel row. The left portion of the left pixel is aligned in the right upward alignment direction, and the right portion of the left pixel is aligned in the right downward alignment direction. Also, the left portion of the right pixel is aligned in the left upward alignment direction, and the right portion pixel of the right pixel is aligned in the left downward alignment direction.

As above-described, the liquid crystal display shown in FIG. 17(*c*) and FIG. 18(*c*) has two neighboring pixel groups having the same alignment directions.

If the alignment directions of the liquid crystal are formed as in FIG. 15, FIG. 16, FIG. 17, and FIG. 18, the regions where the liquid crystal alignment directions are changed overlap the portions of the pixels including the gate lines or the data lines such that the texture may not appear, and the viewing angle characteristics may improve due to the various alignment directions of two neighboring pixel groups. Also, the luminance characteristics may be improved, and will be described through Table 2.

TABLE 2

| Structure | Degree of increase of transmittance |
|---|---|
| Ra | 3.1% |
| FIG. 15 | 5.1% |

In Table 2, the Ra structure, which is called PVA, is a structure in which a uniform pattern is added per each pixel to control the alignment direction of the liquid crystal molecules as in Table 1. Differently from Table 1, the increasing values of the transmittances of other exemplary embodiments are measured through additional experiments.

According to Table 2, the exemplary embodiment of FIG. 15 has luminance that is improved by 2% compared with the structure of Ra, and the exemplary embodiments of FIG. 15, FIG. 16, FIG. 17, and FIG. 18 have the effect of the improved luminance.

Liquid crystal displays representing three colors of RGB are described in the first to third exemplary embodiment 3, and now a liquid crystal display representing four colors including white (w) will be described.

Figure 19:
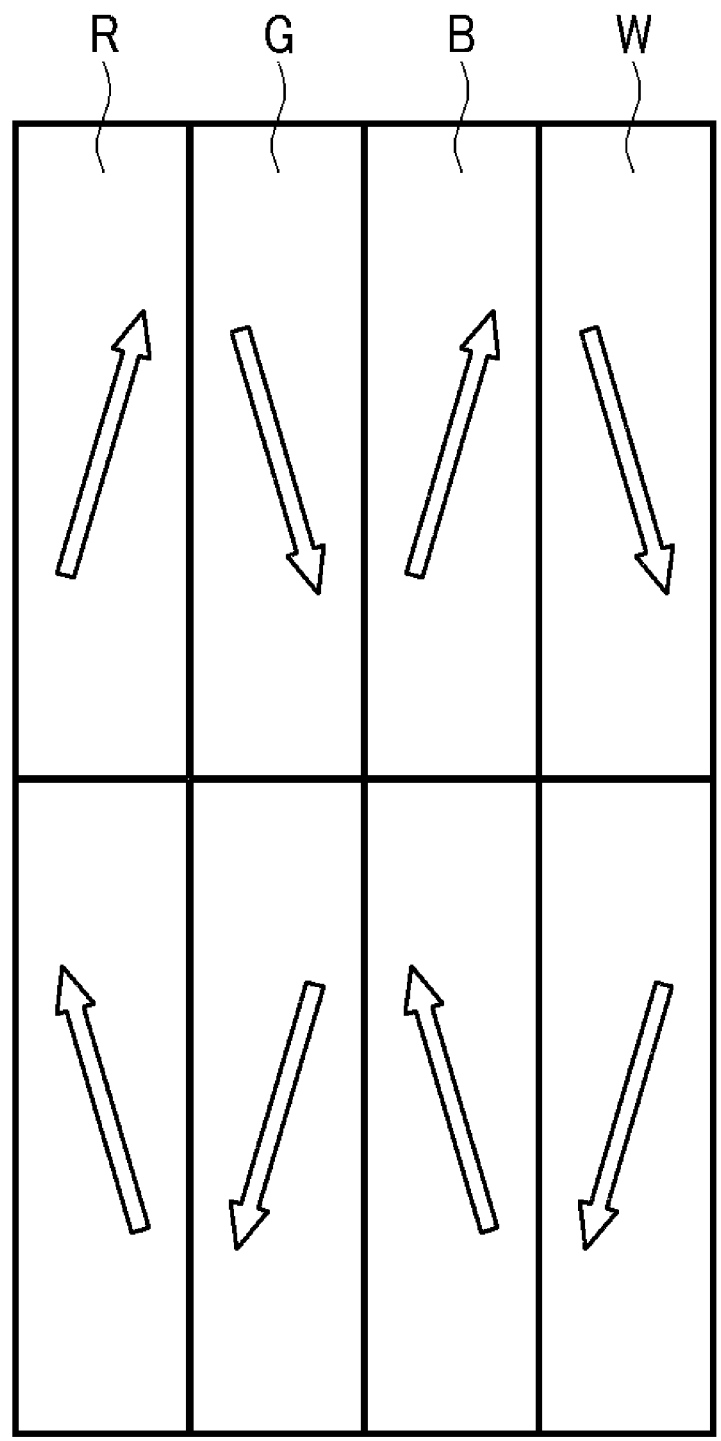
FIG. 19 and FIG. 20 are views showing alignment directions of a four color liquid crystal display according to the fourth exemplary embodiment of the present invention.
Figure 20:
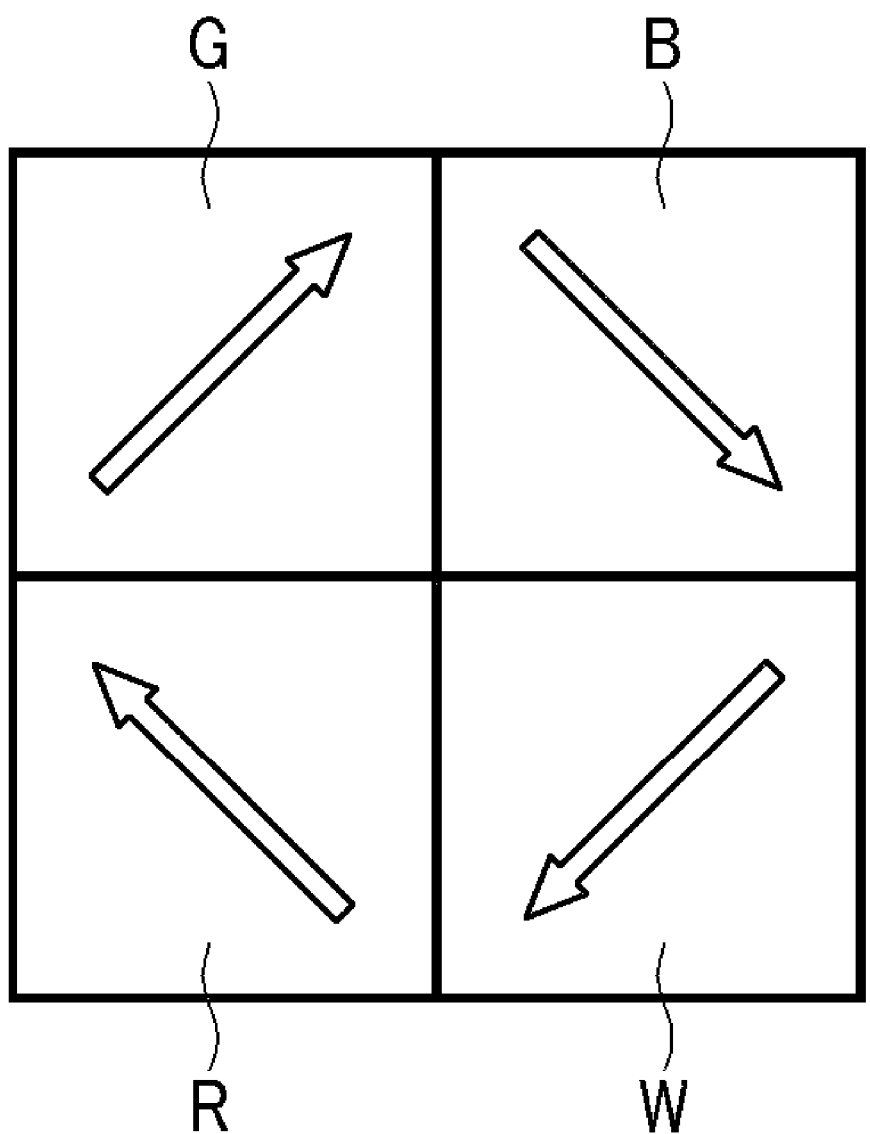

FIG. 19 and FIG. 20 are views showing alignment directions of a four color liquid crystal display according to the fourth exemplary embodiment of the present invention.

As shown in FIG. 19, four color pixels of R, G, B, and W are arranged in the column direction and are aligned in the circular alignment direction. On the other hand, as shown in FIG. 20, four color pixels of R, G, B, and W are arranged as 2×2 columns and rows in which four neighboring pixels form a square, and are aligned in the circular alignment direction.

The circular liquid crystal alignment has been described in FIG. 19 and FIG. 20, however the liquid crystal may be aligned with the non-circular liquid crystal alignment, and it may be possible that only one of the upper or the lower alignment layer is aligned and the pixel is divided into two portion pixels like the third exemplary embodiment.

As above-described, the alignment directions of the alignment layers are shown by the arrows, however, these are only exemplary embodiments and the liquid crystal molecules may be aligned in various directions that are not described in the drawings. However, in exemplary embodiments of the present invention, the alignment layer is aligned to have at least two different directions among light alignment directions corresponding to each other in neighboring pixels, and a technique including this characteristic is included in exemplary embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate comprising a first alignment layer, gate lines, and data lines;
a second substrate facing the first substrate, the second substrate comprising a second alignment layer; and
a liquid crystal layer disposed between the first substrate and the second substrate,
wherein a plurality of pixels are arranged in a matrix defined by the gate lines and the data lines,
wherein an alignment direction of the first alignment layer or the second alignment layer of a first pixel is different than an alignment direction of the corresponding alignment layer in a neighboring pixel,
wherein neighboring pixels form a pixel group,
wherein an overall alignment direction is determined through the vector sum of the alignment directions of the first alignment layer and the second alignment layer, and
wherein the overall alignment direction of the pixel group is circular.

2. The liquid crystal display of claim 1, wherein the alignment direction of the first alignment layer and the alignment direction of the second alignment layer are perpendicular to each other in the first pixel.

3. The liquid crystal display of claim 2, wherein the first substrate further comprises a pixel electrode comprising a first subpixel electrode and a second subpixel electrode spaced apart from each other via a gap.

4. The liquid crystal display of claim 3, wherein the first subpixel electrode comprises a portion having a step shape, and the second subpixel electrode encloses the first subpixel electrode.

5. The liquid crystal display of claim 3, wherein the first alignment layer and the second alignment layer disposed in one pixel forming the pixel group have the same alignment direction on the first subpixel electrode and the second subpixel electrode.

6. The liquid crystal display of claim 3, wherein one of the first alignment layer and the second alignment layer disposed in one pixel forming the pixel group has the same alignment direction on the first subpixel electrode and the second subpixel electrode, and the other has a different alignment direction on the first subpixel electrode than on the second subpixel electrode.

7. The liquid crystal display of claim 1, wherein pixel groups are continuously arranged.

8. The liquid crystal display of claim 7, wherein each pixel group comprises four pixels arranged in a 2×2 matrix.

9. The liquid crystal display of claim 8, wherein the liquid crystal layer is aligned in a different direction in each pixel of the pixel group.

10. The liquid crystal display of claim 9, wherein the pixel group having the circular alignment direction is crossed to the neighboring pixel group by one column in the column direction.

11. The liquid crystal display of claim 9, wherein an overall alignment direction of the pixel group is not circular.

12. The liquid crystal display of claim 8, wherein the liquid crystal display displays images of four colors of R (red), G (green), B (blue), and W (white).

13. The liquid crystal display of claim 12, wherein the four colors are arranged according to the pixel column and neighboring pixels in the column direction have different colors, or a pixel group formed in a 2×2 matrix includes the four colors.

14. The liquid crystal display of claim 7, wherein the pixel group comprises two pixels arranged in one row or one column.

15. The liquid crystal display of claim 14, wherein at least one of the first alignment layer and the second alignment layer disposed in each pixel forming the pixel group is aligned to have a different alignment direction in each pixel.

16. The liquid crystal display of claim 15, wherein the different alignment directions are opposite to each other.

17. The liquid crystal display of claim 15, wherein the pixel group has a circular alignment direction.

18. The liquid crystal display of claim 15, wherein the pixel group has a non-circular alignment direction.

19. The liquid crystal display of claim 1, wherein the alignment directions of the first alignment layer and the second alignment layer are determined by a light alignment method.

* * * * *